United States Patent
Ishitoya (10) Patent No.: US 10,794,788 B2
(45) Date of Patent: Oct. 6, 2020

(54) DYNAMIC BALANCE TESTING DEVICE

(71) Applicant: KOKUSAI KEISOKUKI KABUSHIKI KAISHA, Tama-shi, Tokyo (JP)

(72) Inventor: Satoshi Ishitoya, Kanagawa (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 16/104,540

(22) Filed: Aug. 17, 2018

(65) Prior Publication Data
US 2019/0011322 A1    Jan. 10, 2019

Related U.S. Application Data

(63) Continuation-in-part of application No. PCT/JP2017/005296, filed on Feb. 14, 2017.

(30) Foreign Application Priority Data

Feb. 29, 2016  (JP) .................. 2016-036593

(51) Int. Cl.
*G01M 1/04* (2006.01)
*G01M 1/16* (2006.01)

(52) U.S. Cl.
CPC .............. *G01M 1/04* (2013.01); *G01M 1/16* (2013.01); *Y02T 10/6204* (2013.01); *Y02T 10/6295* (2013.01)

(58) Field of Classification Search
CPC .. G01M 17/013; G01M 17/02; G01M 17/021; G01M 17/024; G01M 1/02;
(Continued)

(56) References Cited

U.S. PATENT DOCUMENTS 2,375,171 A * 5/1945 Torrey .................... G01M 1/04
                                                                73/480
2,378,237 A * 6/1945 Morris ................ G01M 17/025
                                                                73/600
(Continued)

FOREIGN PATENT DOCUMENTS

CN         104848990 A       8/2015
EP          2189775 A2 *    5/2010   .............. G01M 1/28
(Continued)

OTHER PUBLICATIONS

English Translation of EP2189775 (Year: 2010).*
(Continued)

*Primary Examiner* — Alexander A Mercado
(74) *Attorney, Agent, or Firm* — Oliff PLC (57) ABSTRACT

A dynamic balance testing device includes a plurality of support rollers having respective rotation axes extending in a predetermined direction, the plurality of support rollers being configured to support a specimen in internal contact with an inner periphery of the specimen in such a manner that the specimen is rotatable about a central axis of the inner periphery, the plurality of support rollers including, a first support roller having a first rotation axis that is parallel to the central axis of the inner periphery of the specimen, and a second support roller having a second rotation axis that is parallel to the central axis of the inner periphery of the specimen and is positionally different from the first rotation axis of the first support roller.

20 Claims, 10 Drawing Sheets

(58) Field of Classification Search
CPC .......... G01M 1/04; G01M 1/045; G01M 1/14; G01M 1/16; G01M 1/22; G01M 1/225; B25H 1/02; B25H 1/14; B25H 1/08
See application file for complete search history.

(56) References Cited

U.S. PATENT DOCUMENTS

| | | | | |
|---|---|---|---|---|
| 3,237,310 | A * | 3/1966 | Reiner | G01B 7/06 33/203.16 |
| 4,169,373 | A * | 10/1979 | Clark | G01M 17/02 73/146 |
| 4,434,652 | A * | 3/1984 | Christie | G01M 17/02 73/146 |
| 4,520,307 | A * | 5/1985 | Weiss | G01R 31/1263 324/558 |
| 4,936,138 | A * | 6/1990 | Cushman | G01M 17/025 73/146 |
| 5,054,918 | A * | 10/1991 | Downing | G01B 11/2504 33/203 |
| 5,257,561 | A * | 11/1993 | Folta | G01M 17/021 157/14 |
| 5,365,781 | A * | 11/1994 | Rhyne | B29D 30/0633 73/146 |
| 5,992,227 | A * | 11/1999 | Jellison | G01M 17/021 73/146 |
| 6,082,191 | A * | 7/2000 | Neiferd | G01M 17/024 73/146 |
| 6,131,455 | A * | 10/2000 | Matsumoto | G01M 1/045 73/462 |
| 6,786,093 | B2 | 9/2004 | Miura | |
| 2001/0045125 | A1* | 11/2001 | Alexander | G01N 29/265 73/146 |
| 2003/0188574 | A1* | 10/2003 | Weiss | G01M 17/02 73/146 |
| 2004/0016293 | A1* | 1/2004 | Weiss | G01M 17/02 73/146 |
| 2004/0165180 | A1* | 8/2004 | Voeller | B60C 11/24 356/139.09 |
| 2006/0130576 | A1 | 6/2006 | Turner et al. | |
| 2012/0085158 | A1* | 4/2012 | Murakami | G01M 17/021 73/146 |
| 2013/0128029 | A1* | 5/2013 | Leobal | G01M 17/027 348/128 |
| 2013/0162265 | A1* | 6/2013 | Beccavin | G01N 27/205 324/558 |
| 2013/0174657 | A1* | 7/2013 | Beccavin | G01M 17/02 73/146 |
| 2013/0333615 | A1* | 12/2013 | Wakazono | G01M 17/021 118/500 |
| 2014/0191480 | A1* | 7/2014 | Miyazaki | G01M 17/021 279/133 |
| 2014/0260583 | A1* | 9/2014 | Vernyi | G01M 17/021 73/146 |
| 2015/0185113 | A1* | 7/2015 | Tachibana | G01M 17/02 73/146 |
| 2015/0300922 | A1* | 10/2015 | Wakazono | G01M 17/021 73/146 |
| 2016/0178482 | A1* | 6/2016 | Bor | G01M 17/021 73/146 |
| 2016/0225128 | A1* | 8/2016 | Krolczyk | G01N 21/952 |
| 2016/0231202 | A1* | 8/2016 | Charlat | G01M 17/021 |
| 2018/0045610 | A1* | 2/2018 | Okabe | G01M 17/022 |

FOREIGN PATENT DOCUMENTS

| | | |
|---|---|---|
| JP | 2005-326354 A | 11/2005 |
| JP | 4119302 B2 | 7/2008 |
| JP | 2009-162513 A | 7/2009 |

OTHER PUBLICATIONS

Apr. 11, 2017 International Search Report issued in International Patent Application No. PCT/JP2017/005296.
Oct. 2019 Office Action issued in Chinese Patent Application No. 201780013821.0.

* cited by examiner

DYNAMIC BALANCE TESTING DEVICE

CROSS-REFERENCE TO RELATED APPLICATION

This is a Continuation-in-Part of International Application No. PCT/JP2017/005296 filed on Feb. 14, 2017, which claims priority from Japanese Patent Application No. 2016-036593 filed on Feb. 29, 2016. The entire disclosures of the prior applications are incorporated herein by reference.

TECHNICAL FIELD

The present disclosure relates to dynamic balance testing devices.

BACKGROUND

A rotating body having dynamic imbalance vibrates when rotated. If an amplitude and a phase of the vibration is detected, the dynamic imbalance of the rotating body can be calculated from the detected results. To accurately measure the dynamic imbalance, the rotating body needs to be rotated accurately about a rotation center axis.

A dynamic balance testing device capable of measuring a dynamic imbalance of a rotating body having shafts is conventionally known. This dynamic balance testing device includes two pairs of horizontally disposed rollers. When a shaft on one end side of the specimen (the rotating body) is placed on one of the pairs of rollers and a shaft on the other end side of the specimen is placed on the other of the pairs of rollers, the shafts of the specimen are supported by the respective pairs of rollers to be rotatable accurately about their rotation axes.

The above-mentioned dynamic balance testing device is a device for the measurement of a rotating body having shafts. However, even a rotating body which does not have shafts (e.g., an interim product to which a shaft is not attached yet) can be measured by attaching a shaft for measurement.

SUMMARY

However, since a process for attaching the shaft for measurement to the rotating body before measurement and a process for removing the shaft for measurement from the rotating body after measurement become necessary in measuring a rotating body which does not have shafts, there has been a problem that more man-hours become necessary.

Aspects of the present disclosure are advantageous to provide one or more improved techniques, for a dynamic balance testing device, which make it possible to measure a dynamic imbalance of a rotating body which does not have shafts without attaching a shaft for measurement to the rotating body.

According to aspects of the present disclosure, there is provided a dynamic balance testing device which includes a plurality of support rollers having respective rotation axes extending in a predetermined direction, the plurality of support rollers being configured to support a specimen in internal contact with an inner periphery of the specimen in such a manner that the specimen is rotatable about a central axis of the inner periphery, the plurality of support rollers including, a first support roller having a first rotation axis that is parallel to the central axis of the inner periphery of the specimen, and a second support roller having a second rotation axis that is parallel to the central axis of the inner periphery of the specimen and is positionally different from the first rotation axis of the first support roller.

DETAILED DESCRIPTION OF EMBODIMENTS

Hereinafter, a dynamic balance testing device 1 according to embodiments the present disclosure will be described with reference to the drawings.

The dynamic balance testing device 1 of the present embodiment makes a specimen T, being a rotating body, rotate about its rotation center axis Ax, detects vibration occurring on the specimen T when rotated, and calculates a dynamic balance of the specimen T based on the detected result.

Figure 9:
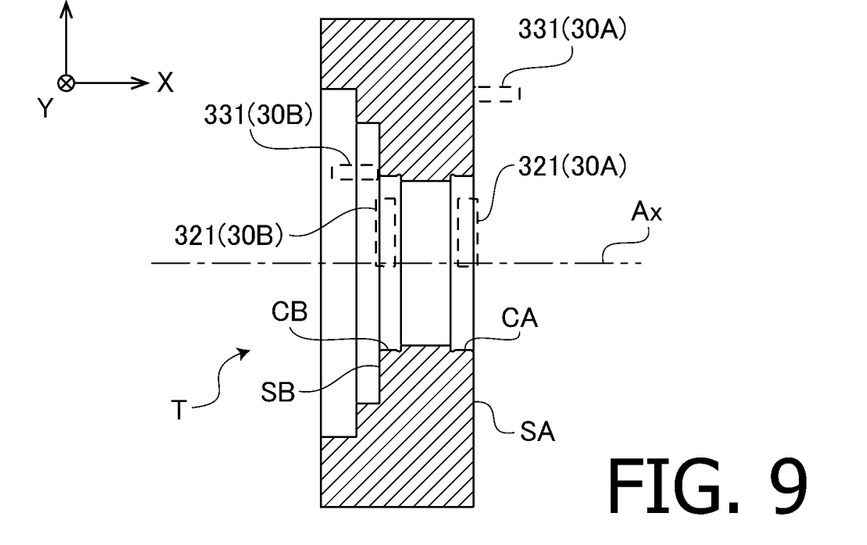
FIG. 9 is a longitudinal section view of a specimen.
Figure 10:
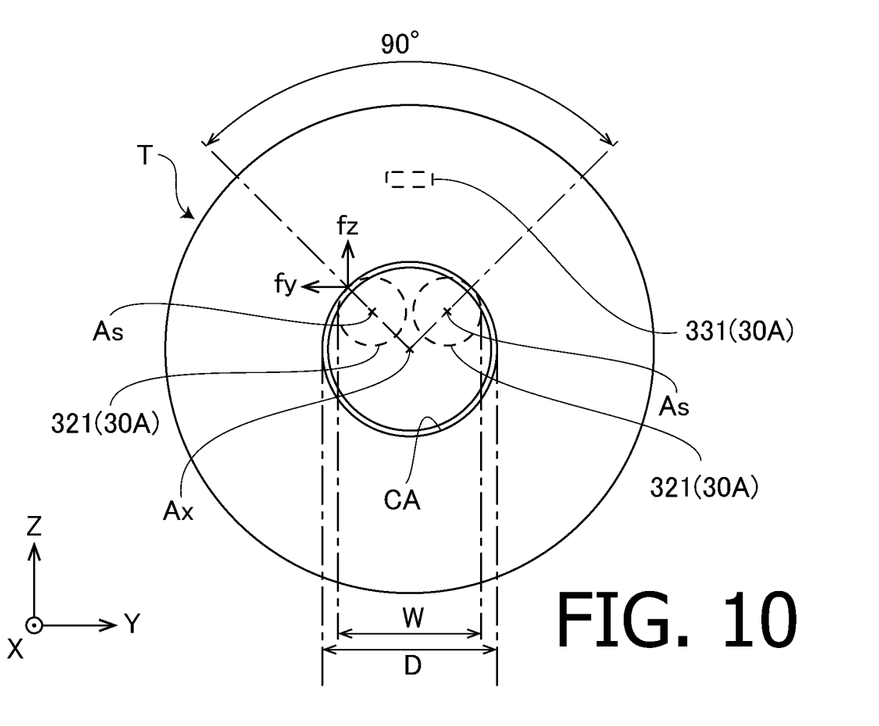
FIG. 10 is a right side view of the specimen.

FIG. 9 is a longitudinal section view of the specimen T, and FIG. 10 is a right side view thereof. The specimen T of the present embodiment is a frame of a rotor for an electric motor. The present embodiment is suitably configured for testing rotors of medium-sized electric motors used for railroad vehicles, electric cars and hybrid cars. It is noted that the present disclosure may also be applied to testing of rotors for small-sized motors used in, for example, hard disc devices and the like or for large-sized motors for industrial machines (e.g., for river drainage pumps). Further, the present disclosure may be applied to dynamic balance testing of, not only the rotors for electric motors but, a variety of rotating bodies (e.g., various automobile parts such as flywheels, hubs and wheels, parts for turbines used for jet engines, power generation facilities and the like, parts for compressors, bearing parts, impellers, blowing fans, rotary wings and the like).

The specimen T is a structural member (e.g., a member formed of aluminum alloy) formed in a rotationally symmetric shape with respect to the rotation center axis Ax, and has inner peripheries CA and DB with the rotation center axis Ax as their centers, and side faces SA and SB being perpendicular to the rotation center axis Ax. The inner peripheries CA and CB are columnar surfaces for inserting a bearing that supports the rotating body rotatably about the rotation center axis Ax in a product (electric motor) state. Therefore, the inner peripheries CA and CB are accurately coaxially formed with respect to the rotation center axis Ax.

Figure 1:
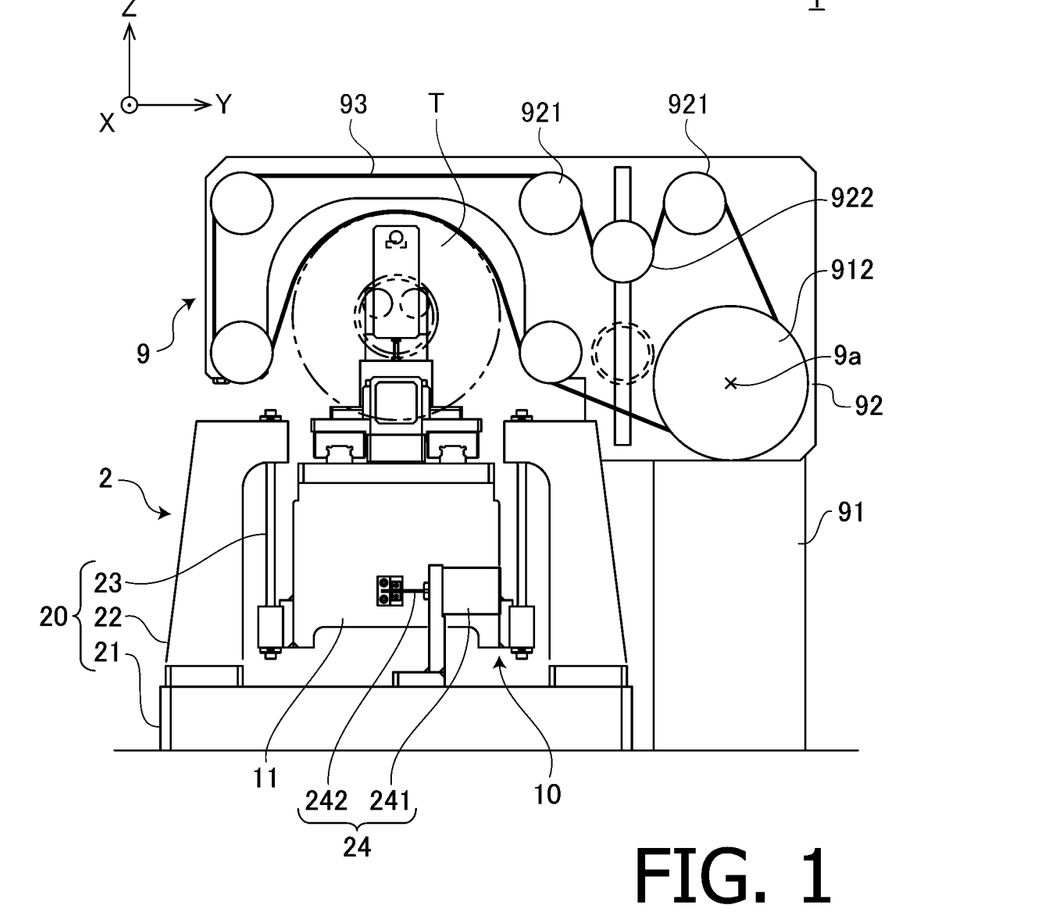
FIG. 1 is a right side view of a dynamic balance testing device according to an embodiment of the present disclosure.

FIG. 1 is a right side view of the dynamic balance testing device 1 according to the embodiment of the present disclosure. In the following description, a right direction in FIG. 1 will be referred to as a Y-axis direction, an upward direction will be referred to as a Z-axis direction, and a direction going from the backside to the front side of the paper perpendicularly to the paper will be referred to as an X-axis direction. The Z-axis direction is a vertical direction, and the X-axis direction and the Y-axis direction are horizontal directions.

Figure 8:
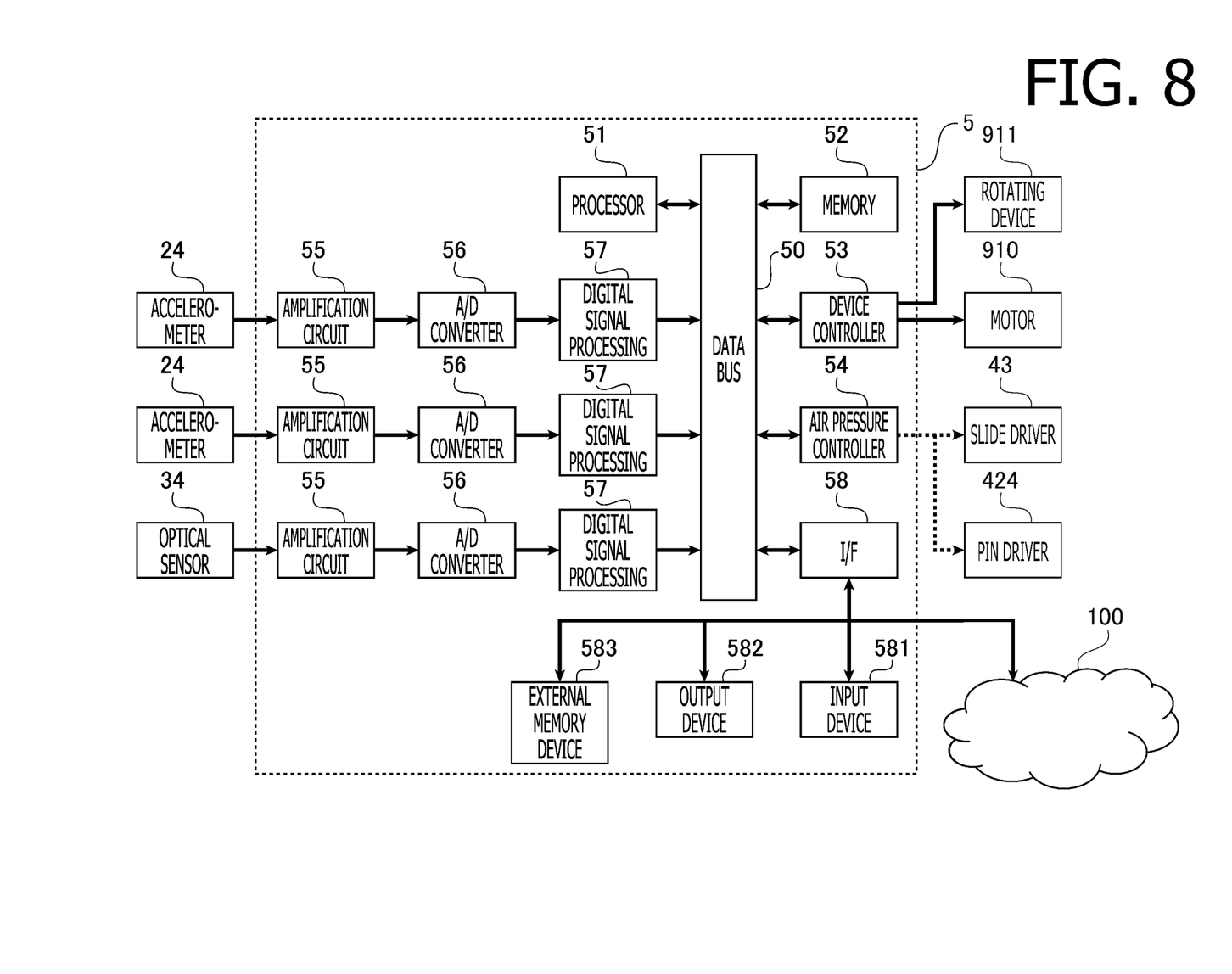
FIG. 8 is a block diagram of a control system of the dynamic balance testing device.

The dynamic balance testing device 1 includes a measuring unit (vibrating table) 2, a rotary driver 9 and a controller 5 (FIG. 8). The rotary driver 9 is a belt drive device that drives the specimen T attached to the measuring unit 2 to rotate. The measuring unit 2 holds the specimen T rotatably about its rotation center axis Ax and detects vibration that occurs when the specimen T is rotated. The controller 5 controls operation of the entire dynamic balance testing device 1.

The rotary driver 9 includes a fixing part 91, a movable part 92 coupled rotatably with respect to the fixing part 91 about a rotation axis 9a extending in the X-axis direction, and an endless belt 93. When the movable part 92 is rotated counterclockwise in FIG. 1, the endless belt 93 closely contacts with an outer surface of the specimen T (FIG. 1). The specimen T is rotationally driven by making the endless belt 93 to circulate in this state. Also, when the movable part 92 is rotated clockwise in FIG. 1, the endless belt 93 is separated from the outer surface of the specimen T. Measurement of the dynamic balance of the specimen T and attachment/detachment of the specimen T to the dynamic balance testing device 1 are carried out in this state. The rotation of the rotary driver 9 is carried out by a rotating device 911 (FIG. 8) provided to the fixing part 91.

The fixing part 91 of the rotary driver 9 includes a driving pulley 912 which is driven to rotate by a motor 910 (FIG. 8).

The movable part 92 of the rotary driver 9 includes five driven pulleys 921 and a dancer pulley 922 which provides a predetermined tension to the endless belt 93. Each of the driving pulley 912, the driven pulleys 921 and the dancer pulley 922 has a rotation axis parallel to the X-axis (i.e., to the rotation center axis Ax of the specimen T attached to the dynamic balance testing device 1). The endless belt 93 is wound around the driving pulley 912, the five driven pulleys 921 and the dancer pulley 922, transfers rotation of the driving pulley 912 to the specimen T which is in close contact with the endless belt 93, an makes the specimen T rotate about its rotation center axis Ax.

As shown in FIG. 1, the measuring unit 2 includes a vibrating part 10, and a supporting part 20 which supports the vibrating part 10 with a relatively low rigidity. The vibrating part 10 is elastically supported by the supporting part 20 vibratably in horizontal directions.

The supporting part 20 includes a base 21, four support columns 22 being set up on an upper surface of the base 21, four bar springs 23 being suspended from upper end portions of respective support columns 22, and a pair of accelerometers 24.

Figure 2:
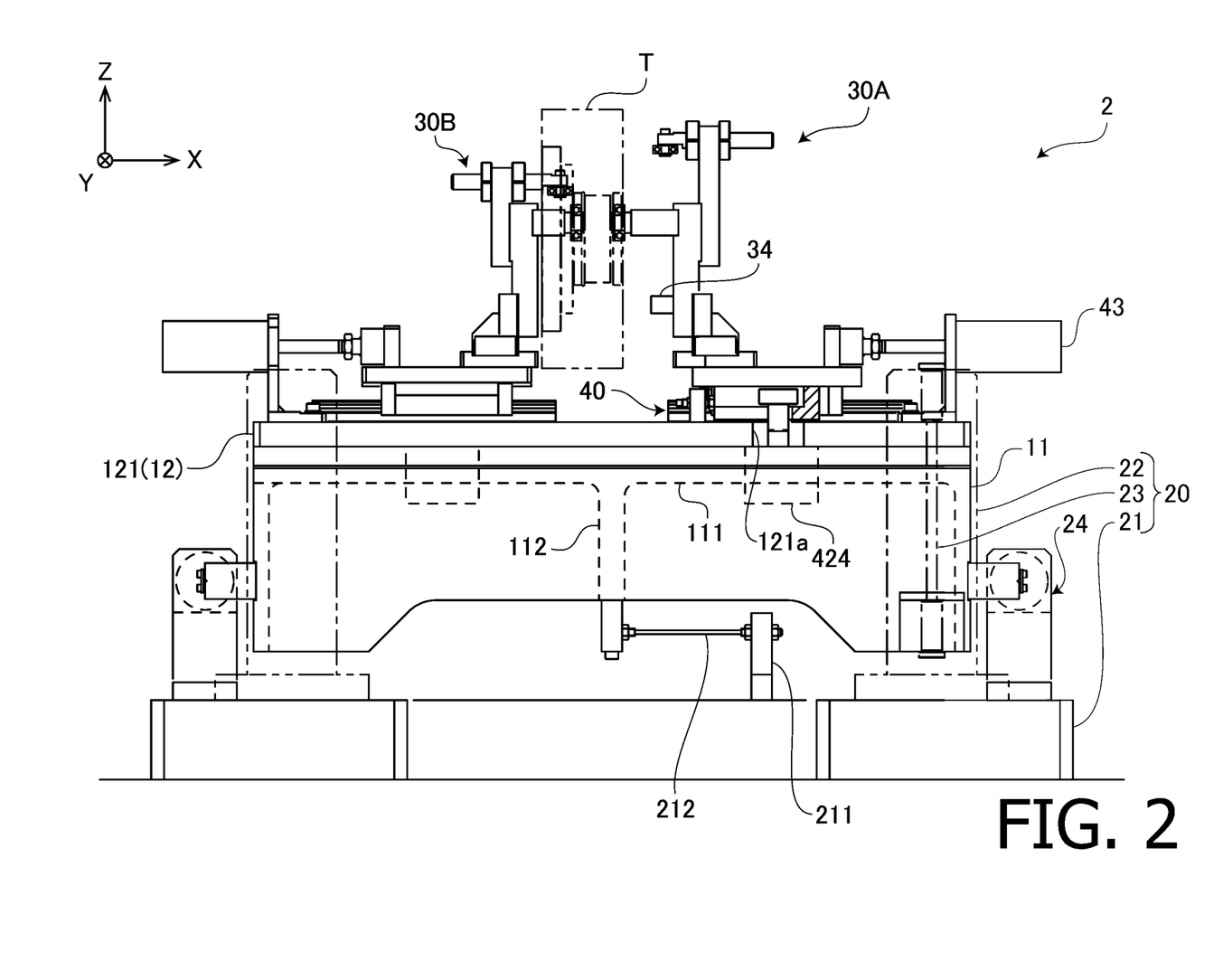
FIG. 2 is a front view of a measuring unit of the dynamic balance testing device according to the embodiment of the present disclosure.
Figure 3:
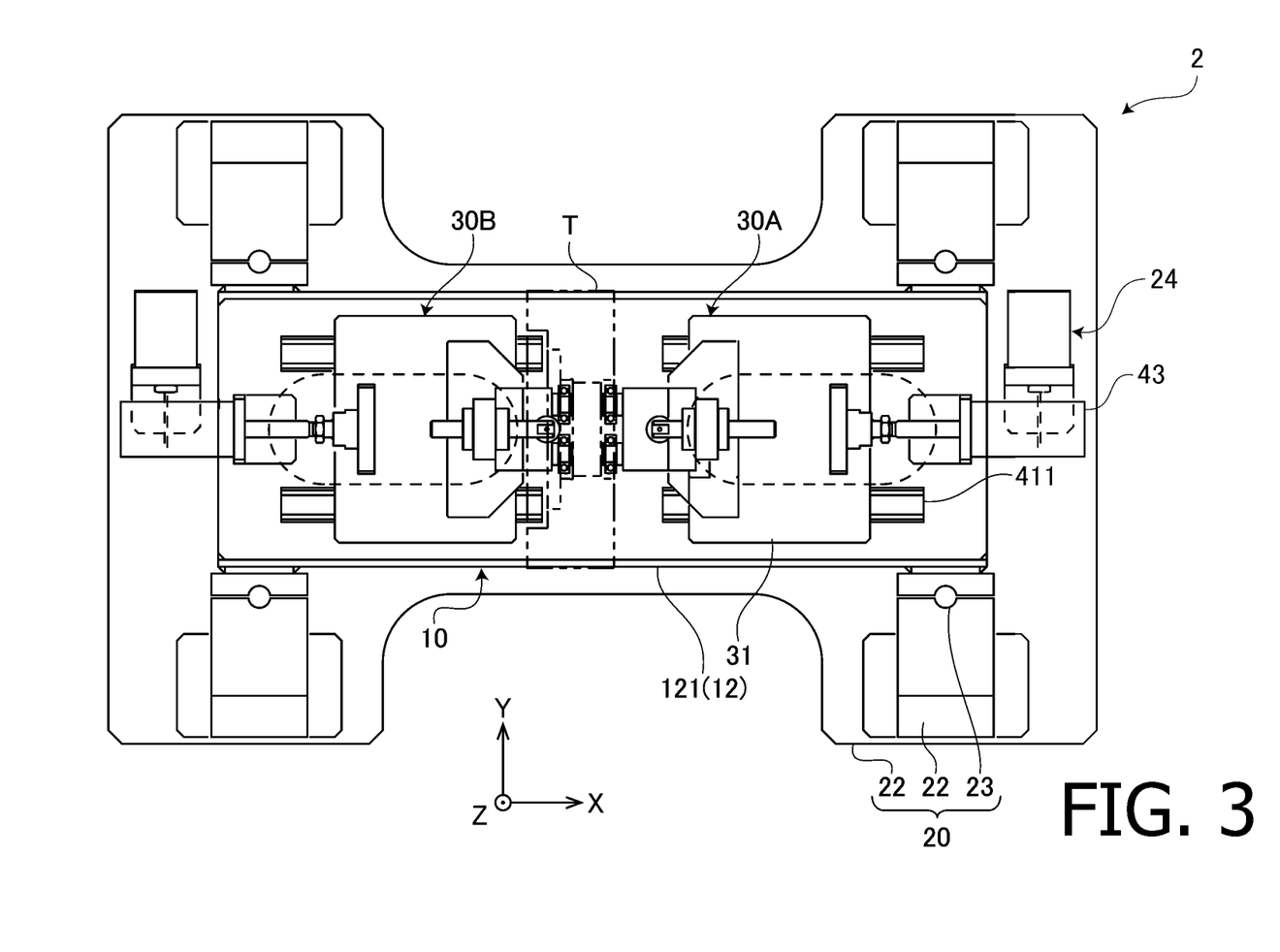
FIG. 3 is a plan view of the measuring unit of the dynamic balance testing device according to the embodiment of the present disclosure.

FIG. 2 is a front view of the measuring unit 2, and FIG. 3 is a plan view of the measuring unit 2. The vibrating part 10 includes a bench 11, and a main unit 12 installed on the bench 11. One end of each of the four bar springs 23 is fixed to corresponding one of four corners of a lower end portion of the bench 11. The vibrating part 10 is supported by the four bar springs 23 vibratably (swingably) in horizontal directions.

Main units 241 of the accelerometers 24 of the pair (FIG. 1) are attached on an upper surface of the base 21 at respective end portions in the X-axis direction. Also, probes 242 of the accelerometers 24 extending in the Y-axis direction are fixed on respective side faces of the bench 11 at end portions in the X-axis direction. By the pair of accelerometers 24, accelerations (vibrations) in the Y-axis direction at both end portions of the vibrating part 10 in the X-axis direction are detected.

As shown in FIG. 2, the base 21 and the bench 11 are coupled by a bar spring 212 extending in the X-axis direction. Specifically, one end of the bar spring 212 is fixed to a lower end portion of a rib 112 extending downwardly from a lower surface of a top plate 111 at a central portion of the bench 11 in the X-axis direction. Further, the other end of the bar spring 212 is fixed to a bracket 211 protruding from the upper surface of the base 21. The bar spring 212 tolerates vibration of the bench 11 with respect to the base 21 in the Y-axis direction by its deflection while preventing vibration of the bench 11 with respect to the base 21 in the X-axis direction by a high rigidity in its longitudinal direction (X-axis direction).

Vibration of the bench 11 with respect to the base 21 in the vertical (Z-axis) direction is prevented by the above-described bar springs 23. Furthermore, the vibration of the bench 11 with respect to the base 21 in the X-axis direction is prevented by the bar spring 212. As a result, the bench 11 is supported with respect to the base 21 vibratably almost only in the Y-axis direction.

Figure 4:
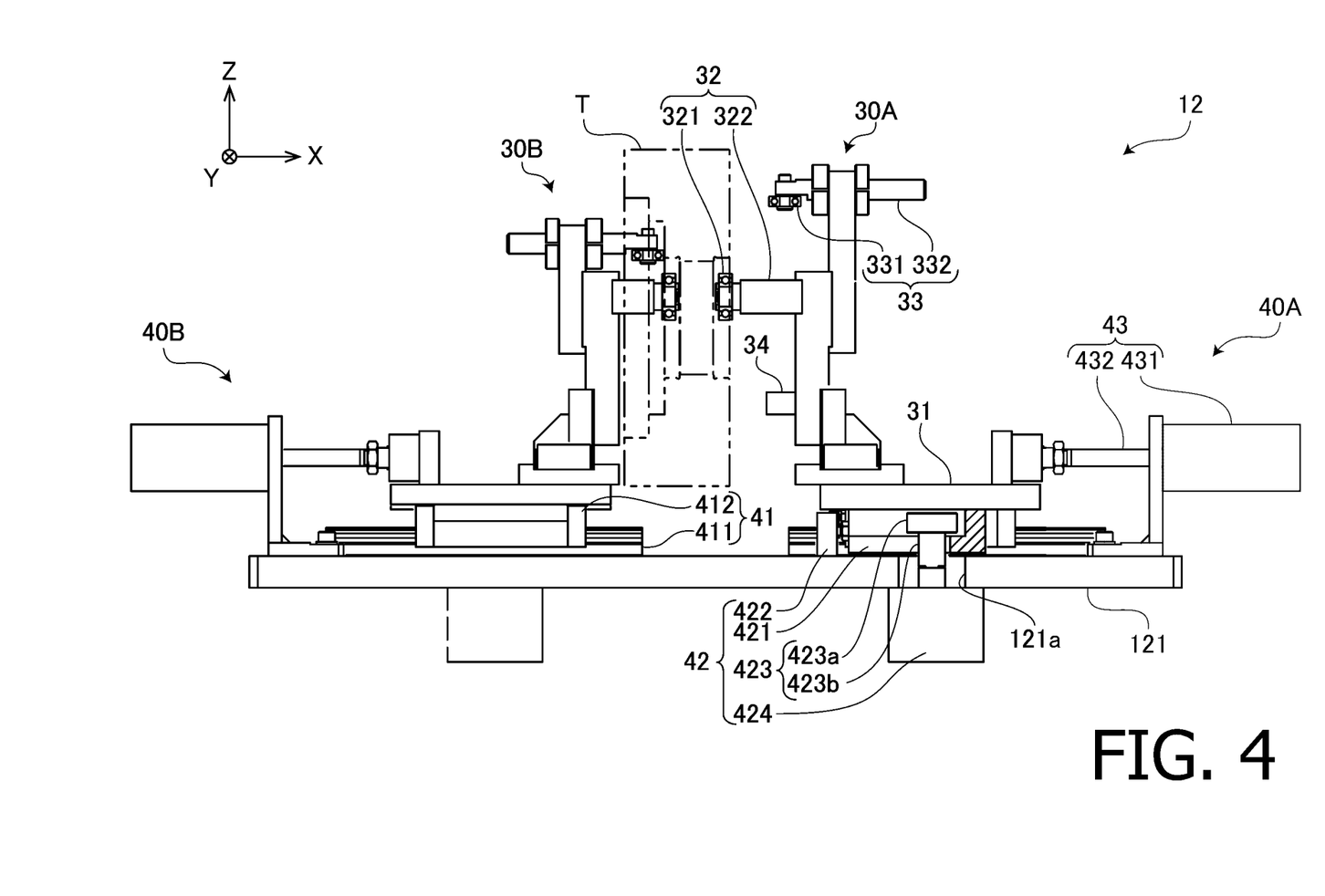
FIG. 4 is a front view of a main unit of the dynamic balance testing device according to the embodiment of the present disclosure.
Figure 5:
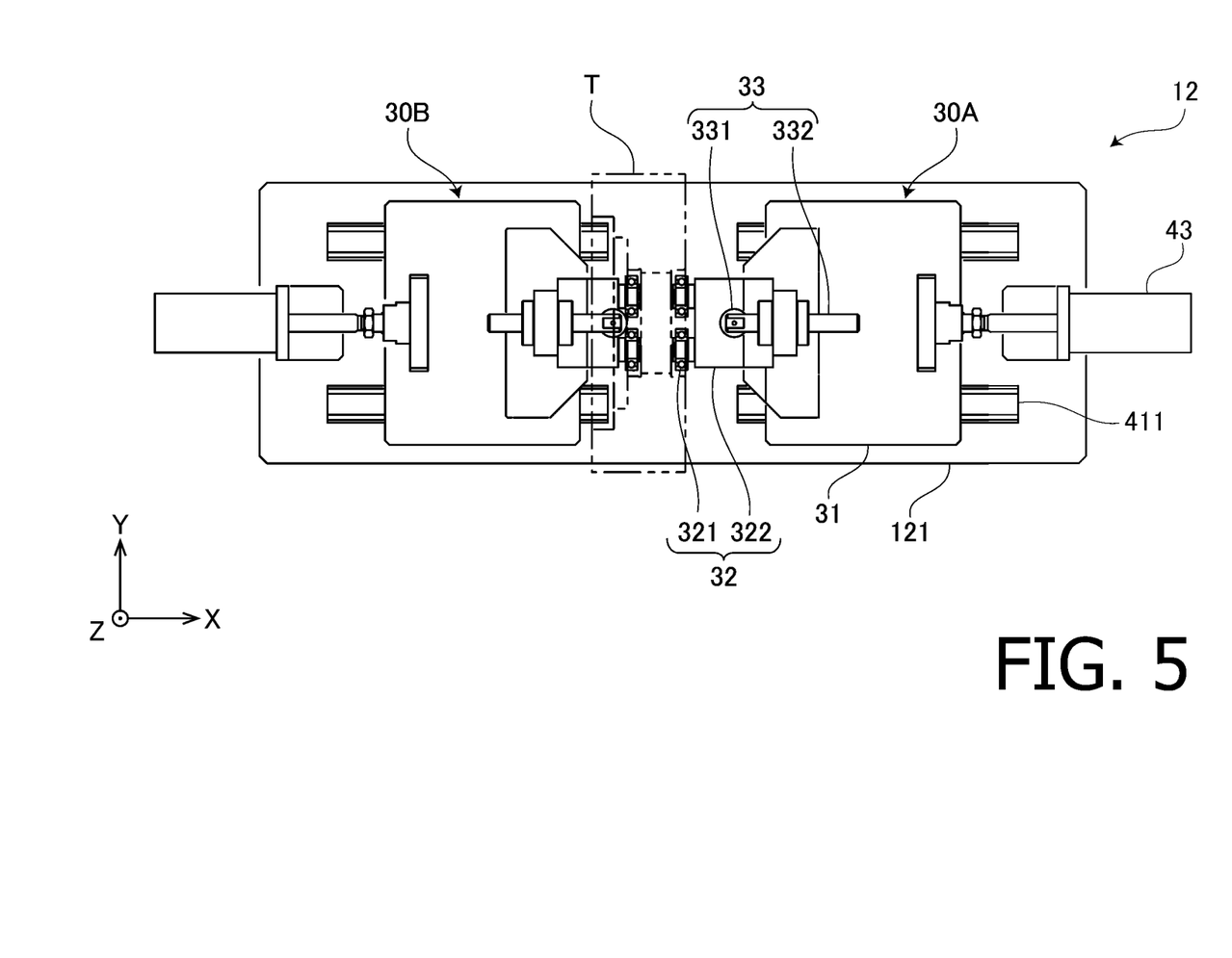
FIG. 5 is a plan view of the main unit of the dynamic balance testing device according to the embodiment of the present disclosure.
Figure 6:
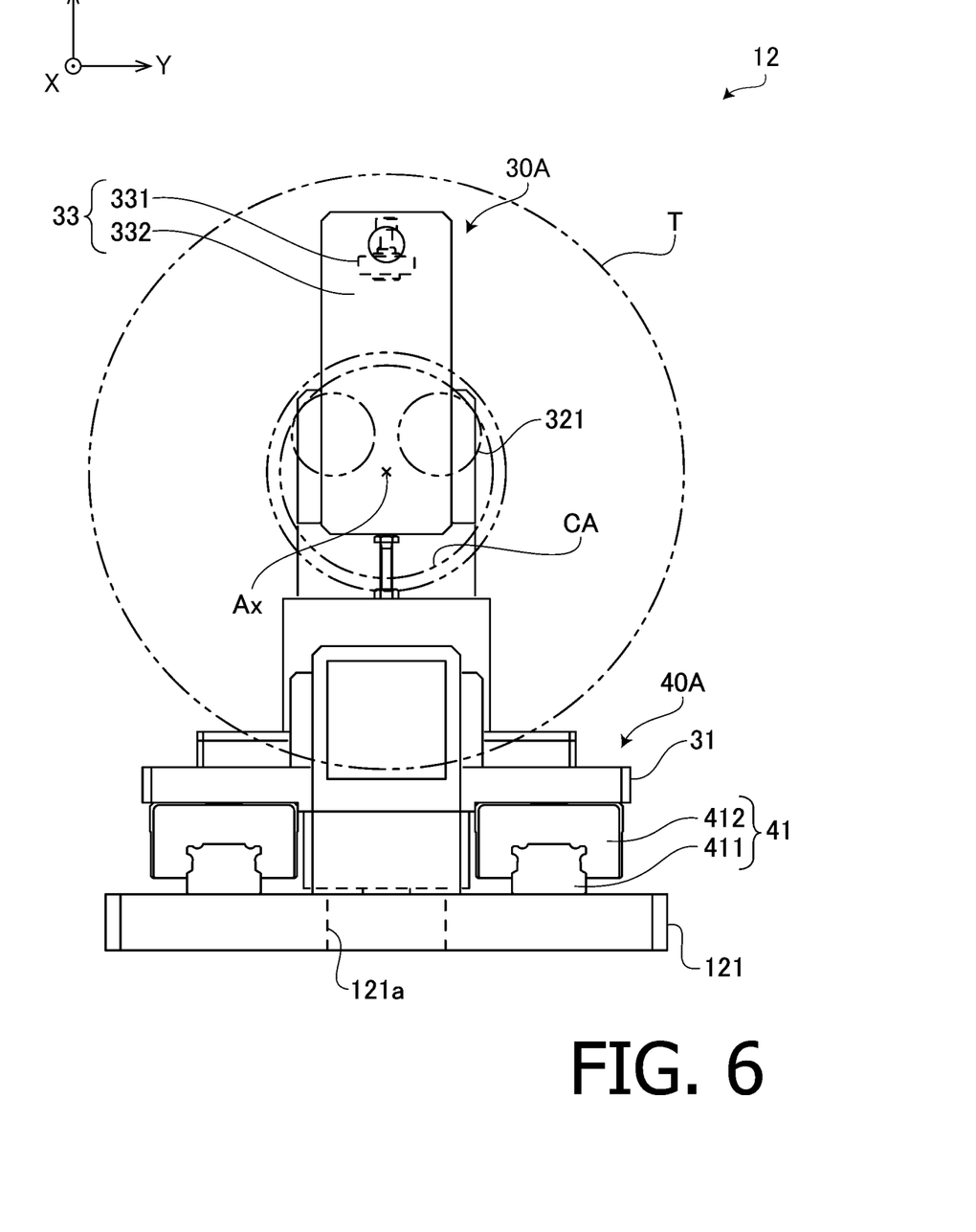
FIG. 6 is a right side view of the main unit of the dynamic balance testing device according to the embodiment of the present disclosure.

FIG. 4, FIG. 5 and FIG. 6 are a front view, a plan view and a right side view of the main unit 12, respectively.

The main unit 12 includes a base 121, a pair of holders 30 (a first holder 30A and a second holder 30B), and a pair of slide mechanisms 40 (a first slide mechanism 40A and a second slide mechanism 40B), the slide mechanisms 40 coupling respective holders 30 to the base 121 slidably in the X-axis direction. The first holder 30A is disposed at a positive side in the X-axis direction with respect to the specimen T, and the second holder 30B is disposed at a negative side in the X-axis direction with respect to the specimen T. It is note that the specimen T is attached to the main unit 12 while making the inner periphery CA and the side face SA to face toward the first holder 30A and making the inner periphery CB and the side face SB to face toward the second holder 30B.

The holder 30 includes a base 31, a bearing part 32, and a pressing part 33. The bearing part 32 and the pressing part 33 are fixed on an upper surface of the base 31. Also, one of the holders (in the present embodiment, the first holder 30A) includes an optical sensor 34 which detects a rotational position of the specimen T.

The bearing part 32 includes a pair of rollers 321 (support rollers), and a supporting part 322 which supports the pair of rollers 321. The supporting part 322 is configured such that a position and an orientation of the pair of rollers 321 is adjustable. Furthermore, the supporting part 322 is configured such that a distance between rotation axes As of the rollers 321 of the pair is adjustable as well.

The pressing part 33 includes a single roller 331 (a pressing roller), and a supporting part 322 which supports the roller 331. The roller 331 is disposed while orienting its rotation axis in parallel with the Z-axis. The supporting part 332 is configured such that a position and an orientation of the roller 331 is adjustable.

Each of the rollers 321 and 331 includes rolling bodies (balls or rollers) interposed between an inner ring (a fixed ring) and an outer ring (a rotating ring) and is configured such that the outer ring is capable to rotate with little frictional resistance.

As shown in FIG. 10, respective rotation axes As of the rollers 321 of the pair are positionally different from each other and are oriented in parallel with the X-axis (i.e., the rotation center axis Ax of the specimen T attached to the dynamic balance testing device 1). Also, the two rollers 321 have an identical diameter and are arranged in the Y-axis direction (i.e., at an identical height). Furthermore, a distance between the rotation axes As of the two rollers 321 is set to a predetermined distance determined based on an inner diameter of the inner periphery CA or CB of the specimen T.

It is noted that the rollers 321 of the pair need not necessarily disposed at an identical height, but the specimen T is most stably held when they are disposed at an identical height (more precisely, when they are disposed such that contact positions between respective rollers 321 and the inner periphery CA (or CB) are at an identical height). Furthermore, in the present embodiment, the rollers 321 of the pair has an identical diameter, but a pair of rollers 321 having different outer diameters may be used. The outer diameters of the rollers 321 of the pair and the disposition distance between the rollers 321 of the pair are set based on the inner diameter of the inner periphery CA (or CB) of the specimen T.

As shown in FIG. 6, FIG. 9 and FIG. 10, the specimen T is supported rotatably about the rotation center axis Ax by two pairs of rollers 321 (the pair of rollers 321 of the first holder 30A and the pair of rollers 321 of the second holder 30B). Specifically, the inner periphery CA of the specimen T is placed on the pair of rollers 321 of the first holder 30A, and the inner periphery CB of the specimen T is placed on the pair of rollers 321 of the second holder 30B. In this state, the rollers 321 of the pair of the first holder 30A are in internal contact with the inner periphery CA of the specimen T, and the rollers of the pair of the second holder 30B are in internal contact with the inner periphery CB of the specimen T.

In the present embodiment, since the inner periphery CA and the inner periphery CB of the specimen T have an identical inner diameter, the outer diameters, the distance between the rotation axes As and the heights of the rollers 321 of the pair of the first holder 30A are identical to those of the second holder 30B. If the inner periphery CA and the inner periphery CB have different inner diameter, at least one of the outer diameters, the distance between the rotation axes As and the heights of the rollers 321 of the pair varies between the first holder 30A and the second holder 30B. These dimensions are determined such that a circumferential surface (the inner periphery CA) with which the rollers 321 of the pair of the first holder 30A are in internal contact and a circumferential surface (the inner periphery CB) with which the rollers 321 of the pair of the second holder 30B are in internal contact become coaxial.

As shown in FIG. 10, in the present embodiment, the rollers 321 of the pair are disposed with a central angle (an orientation difference) of 90 degrees between the respective center axes of the rollers 321 of the pair around the rotation center axis Ax of the specimen T supported by the rollers 321. In other words, the rollers 321 of the pair are disposed with an angle of 90 degrees between a plane including the rotation axis As of one of the rollers 321 of the pair and the rotation center axis Ax of the specimen T supported by the rollers 321 and a plane including the rotation axis As of the other of the rollers 321 of the pair and the rotation center axis Ax of the specimen T supported by the rollers 321. In this case, the specimen T is stably supported because the specimen T receives, from each of the rollers 321, forces fy and fz of equal magnitudes in the Y-axis direction and the Z-axis direction, respectively. It is noted that the disposition angle of the rollers 321 of the pair with respect to the rotation center axis Ax of the specimen T supported by the rollers 321 is not limited to 90 degrees. The rollers 321 of the pair may be disposed within such a range that the rollers 321 of the pair do not contact each other and that an outside distance W of the pair of rollers 321 (i.e., a distance between farthest positions on the rollers 321 of the pair from each other in the Y-axis direction in FIG. 10) is smaller than the diameter of the inner periphery CA (the inner periphery CB). It should be noted that, when rotation axes As of the rollers 321 of the pair are not disposed at the same height, the outside distance W is a distance between farthest positions on the rollers 321 of the pair from each other in a direction perpendicular to the X-axis direction.

It is noted that, when the outside distance W of the rollers 321 of the pair is widened up to a diameter D of the inner periphery CA (the inner periphery CB), since there is no clearances between the rollers 321 of the pair and the inner periphery CA (the inner periphery CB), it becomes difficult to insert the pair of rollers 321 inside the inner periphery CA (the inner periphery CB) when attaching/detaching the specimen T.

As shown in FIG. 9, an outer periphery of the roller 331 of the pressing part 33 of the first holder 30A is pressed against the side face SA of the specimen T. Also, an outer periphery of the roller 331 of the pressing part 33 of the second holder 30B is pressed against the side face SB of the specimen T. That is, the specimen T is nipped between the roller 331 of the first holder 30A and the roller 331 of the second holder 30B from both sides in the X-axis direction. By this configuration, the specimen T is held at a constant position in the X-axis (the rotation center axis Ax) direction in a state where the specimen T is rotatable about its rotation center axis Ax (In other words, a position of the specimen T in a direction of the rotation center axis Ax is restricted within a certain range). It is noted that the pressing part 33 may be provided only to one of the holders 30 (e.g., only to the first holder 30A), or the pressing part 33 may not be provided to either of the holders 30. When it is assumed that the inner peripheries CA and CB of the specimen T and the rollers 321 have sufficiently accurate shapes and dispositions, respectively, the position of the specimen T in the direction of the rotation center axis Ax is maintained within a certain range even without use of the pressing part 33.

It is noted that the orientation of the rotation axis of the roller 331 is set such that moving directions of the outer periphery of the roller 331 and the side face SA of the specimen T at a contacting portion between the roller 331 and the side face SA of the specimen T coincide. In the present embodiment, since the roller 331 contacts the specimen T right above the rotation center axis Ax of the specimen T, the rotation axis of the roller 331 is oriented in the Z-axis direction.

Figure 7:
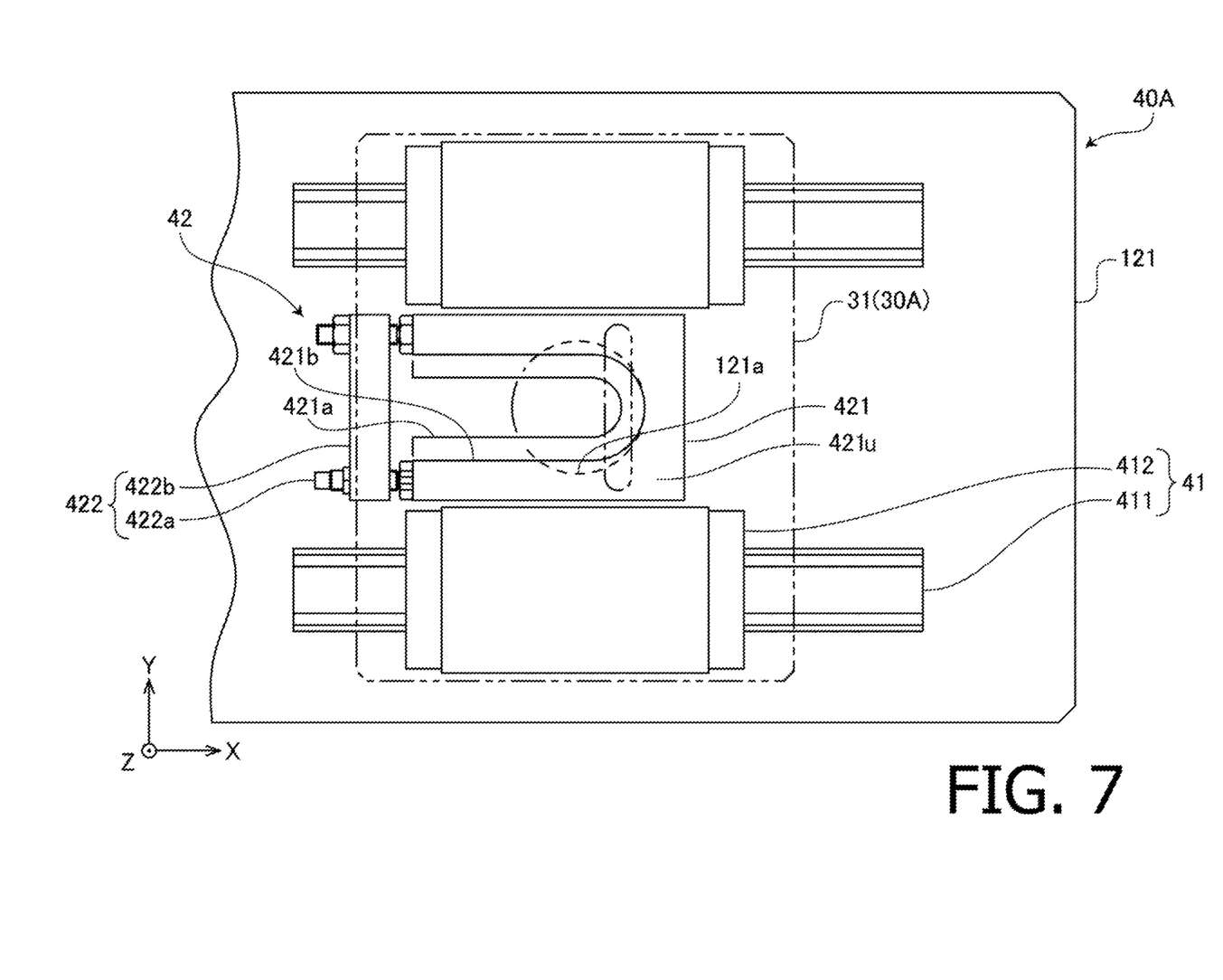
FIG. 7 is a plan view of a slide mechanism.

FIG. 7 is a plan view of a main portion of the first slide mechanism 40A. The slide mechanism 40 includes a pair of linear guideways 41 which couples the holder 30 to the base 121 movably in the X-axis direction, a lock mechanism 42 which locks the holder 30 to the base 121, and a slide driver 43 (FIG. 4 and FIG. 5) which drives the holder 30 in the X-axis direction.

The linear guideway 41 includes a rail 411 extending in the X-axis direction and fixed on the upper surface of the base 121, and a carriage 412 which runs on the rail 411. The linear guideway 41 supports the holder 30 movably only in the X-axis direction. Each carriage 412 is attached to a lower surface of the base 31 of the holder 30.

The slide driver 43 (FIG. 4 and FIG. 5) is a linear actuator, such as an air cylinder, having a drive rod 432 movable in the X-axis direction. A main unit 431 of the slide driver 43 is fixed to the base 121. Further, a distal end of the drive rod 432 is fixed to the base 31 of the holder 30. The holder 30 is driven in the X-axis direction by making the drive rod 432 to advance and retreat.

When removing the specimen T, the drive rod 432 of each of the slide drivers 43 is retracted in the main unit 431, and the first holder 30A and the second holder 30B are driven, in directions that the first holder 30A and the second holder 30B move away from each other, up to retreat positions (positions for attaching/detaching the specimen T). Specifically, the first holder 30A is driven, by the slide driver 43 of the first slide mechanism 40A, in the X-axis positive direction up to the retreat position, and the second holder 30B is driven, by the slide driver 43 of the second slide mechanism 40B, in the X-axis negative direction up to the retreat position.

Also, when executing the test with the specimen T attached, the drive rods 432 of respective slide drivers 43 are pushed out of the main unit 431, and the first holder 30A and the second holder 30B are driven, in mutually approaching directions, up to testing positions (positions for executing the dynamic balance test).

As shown in FIG. 4 and FIG. 7, the lock mechanism 42 includes a frame 421 attached to the lower surface of the base 31 of the holder 30, a stopper 422 attached to the upper surface of the base 121, a locking pin 423, and a pin driver 424 which drives the locking pin 423 in the up-down direction.

To the substantially U-shaped frame 421, a slot 421a extending in the X-axis direction is formed. Furthermore, on the upper surface 421u of the frame 421, a spot-face part 421b is formed around the slot 421a.

The stopper 422 includes a block 422b fixed to the base 121, and a pair of shock absorbers 422a held by the block 422b. When the holder 30 is moved inwardly in the X-axis direction (in case of the holder 30A, in the X-axis negative direction) by the slide driver 43, the frame 421 (specifically, both ends of the U-shape of the frame 421) of the lock mechanism 42 fixed to the holder 30 abuts the stopper 422. By this configuration, the stopper 422 makes the holder 30 to stop and positions the same at a predetermined position. Furthermore, the shock absorbers 422a are provided at portions where the frame 421 abuts, and the impact between the stopper 422 and the frame 421 is relaxed by the shock absorbers 422a.

The locking pin 423 has a substantially columnar head 423a provided at an upper end portion thereof, and a substantially columnar shaft 423b extending downwardly from a center of a lower surface of the head 423a. The head 423a of the locking pin 423 has an outer diameter that is smaller than a width of the spot-faced part 421b and an axial length that is smaller than a depth of the spot-faced part 421b, and is disposed in a space surrounded by the base 31 and an upper surface of the spot-faced part 421b of the frame 421. The shaft 423b is inserted through the slot 421a of the frame 421 and a through hole 121a formed to the base 121, and is coupled to a drive rod of the pin driver 424 attached to a lower surface of the base 121. The pin driver 424 is a linear actuator, such as an air cylinder, having a driver movable in the Z-axis direction.

When the locking pin 423 is pushed upward by the pin driver 424 up to an upper limit, the head 423a of the locking pin 423 is in a state where it is separated from both the lower surface of the base 31 and the upper surface of the spot-faced part 421b of the frame 421. Therefore, in this state, the holder 30 is movable in the X-axis direction without being interfered by the locking pin 423 (unlocked state).

The outer diameter of the head 423a of the locking pin 423 is greater than the width of the slot 421a. Therefore, when the locking pin 423 is pulled down by the pin driver 424 up to a lower limit, the lower surface of the head 423a of the locking pin 423 is firmly pressed against the upper surface of the spot-faced part 412b of the frame 421. As a result, strong friction force occurs between the lower surface of the head 423a of the locking pin 423 and the upper surface of the spot-faced part 421b of the frame 421, and the movement of the holder is thereby restricted (locked state).

When testing, the lock mechanism 42 is in the locked state, and the holder 30 is locked with respect to the base 121. Further, during the attachment/detachment of the specimen T, the lock mechanism 42 is in the unlocked state, and the holder 30 is movable in the X-axis direction.

Next, a control system of the dynamic balance testing device 1 will be described. FIG. 8 is a block diagram showing a schematic configuration of the control system of the dynamic balance testing device 1.

The controller 5 includes a processor 51, a memory 52, a drive controller 53, an air pressure controller 54, an interface 58, an input device 581, an output device 582, an external memory device 583, and three systems each including an amplification circuit 55, an A/D converter 56 and a digital signal processing circuit 57. The processor 51, the memory 52, the drive controller 53, the air pressure controller 54, the interface 58 and each digital signal processing circuit 57 are connected to a data bus 50. The input device 581 such as a keyboard or a mouse, the output device 582 such as a display or a speaker, the external memory device 583 such as a memory card, and a network 100 are connected to the data bus 50 via the interface 58. Further, the system including the amplification circuit 55, the A/D converter 56 and the digital signal processing circuit 57 is provided to each of the accelerometers 24 of the pair and the optical sensor 34.

The memory 52 includes a main memory device and an auxiliary memory device. When the dynamic balance testing device 1 is activated, the processor 51 reads out and executes a control program stored in the auxiliary memory device, and controls each part of the dynamic balance testing device 1 in accordance with the control program.

The drive controller 53 generates, based on a command from the processor 51, drive currents for driving the motor 910 and the rotating device 911, respectively, and provides the drive currents to the motor 910 and the rotating device 911.

The air pressure controller 54 includes a compressor and a control valve not shown, and generates, based on a command from the processor 51, air pressures for driving the slide driver 43 and the pin driver 424, respectively.

An analogue signal output from each accelerometer 24 is amplified by the amplification circuit 55 and is then converted to a digital signal by the A/D converter 56. The digital signal processing circuit 57 performs a filter processing (a noise reduction processing) on the digitalized signal from the accelerometer 24 and then outputs to the data bus 50.

An analogue signal output from the optical sensor 34 is amplified by the amplification circuit 55 and is then converted to a digital signal by the A/D converter 56. The digital signal processing circuit 57 performs the filter processing on the digitalized signal from the optical sensor 34 and then converts the filtered signal to phase data indicating the rotational position of the specimen T and outputs the phase data to the data bus 50.

The processor 51 accumulates data output from each digital signal processing circuit 57 in the memory 52, and calculate the imbalance of the specimen T based on the data accumulated in the memory 52 over a predetermined period of time (i.e., two acceleration data streams obtained from the outputs of the accelerometers 24 of the pair and a phase data stream obtained from the output of the optical sensor 34). The imbalance calculation result is output to the output device 582, the external memory device 583 or the network 100.

According to the above-described embodiment, it becomes possible to measure a dynamic imbalance of a rotating body which does not have shafts without attaching a shaft for measurement to the rotating body. Therefore, a process for attaching the shaft for measurement to the rotating body before measurement and a process for removing the shaft for measurement from the rotating body after measurement become unnecessary, thereby making it possible to measure the dynamic imbalance of the rotating body with lesser man-hours.

Also, the shaft for measurement has certain shape error and/or imbalance, and therefore there has also been a problem that measurement accuracy degrades by the use of the shaft for measurement. Furthermore, there has also been a problem that the rotating body and the shaft for measurement are damaged by the attachment/detachment of the shaft for measurement. According to the above-described embodiment, not only the reduction of man-hours but also improvement in measuring accuracy and reduction of defective rate become possible by eliminating the need of the shaft for measurement.

The above description is directed to an example of embodiments of the present disclosure. The embodiments of the present disclosure are not limited to the above-described embodiment, but are capable of various modifications within the scope of the technical concept expressed by the below-described claims. For example, appropriate combinations of the embodiment and the like as explicitly illustrated in this specification and obvious embodiments may be also included in the embodiments of this application.

In the above-described embodiment, a pair of rollers 321 is provided to each of the first holder 30A and the second holder 30B, but three or more rollers 321 may be provided to each of the first holder 30A and the second holder 30B.

Figure 11:
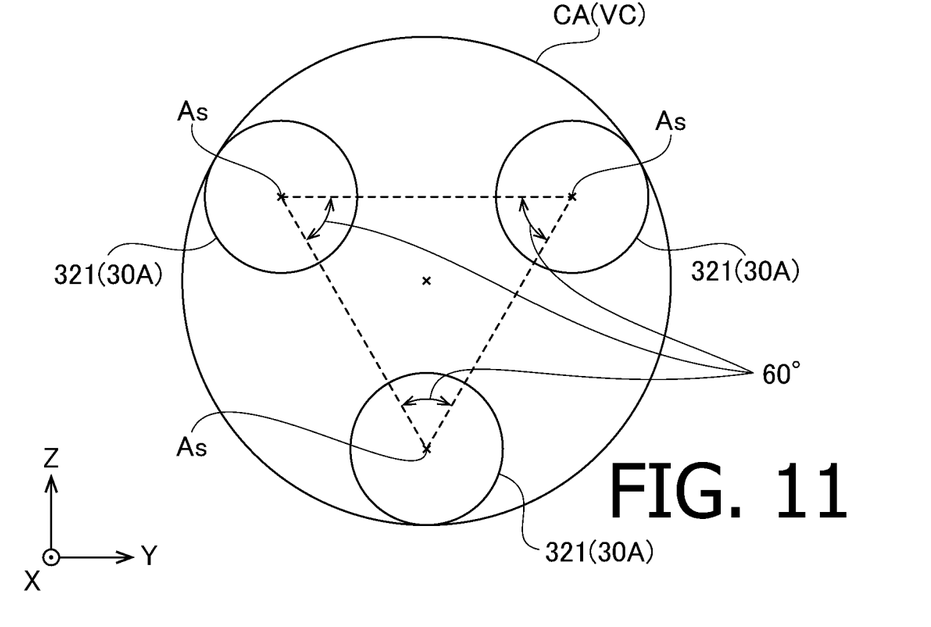
FIG. 11 is a right side view of the specimen.

In case three rollers 321 are provided to each of the holders 30, by disposing two rollers 321 such that internal contact positions of respective rollers 321 with the inner periphery CA (or CB) are at an identical height as with the above-described embodiment, and by disposing the third roller 321 to be in internal contact with a lowermost portion of the inner periphery CA (or CB) of the specimen T supported by the two rollers 321, the specimen T is prevented from dropping off of the rollers 321 while testing due to the inner periphery CA (or CB) moving away from the rollers 321 due to vibration of the specimen T. The specimen T is most stably held by the three rollers when the three rollers are disposed such that a triangle defined by internal contact positions of the three rollers with the inner periphery CA (or CB) forms an equilateral triangle (FIG. 11). Also, it is preferable to provide the third roller movably in a radial direction of the specimen T to make attachment/detachment of the specimen T easier.

Figure 12:
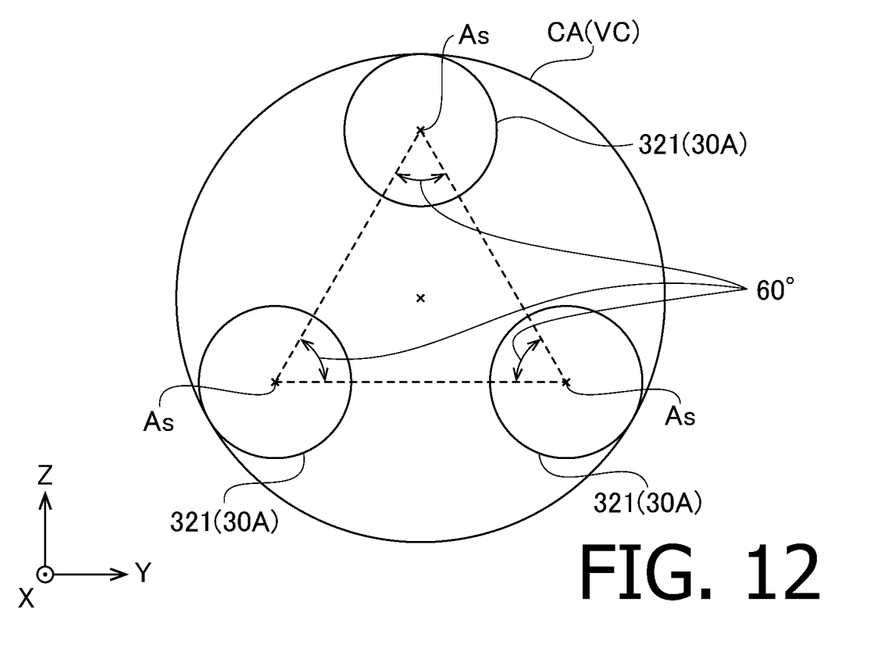
FIG. 12 is a right side view of the specimen.

It is noted that the dispositions of the three rollers 321 are not limited to the dispositions shown in FIG. 11 and FIG. 12, provided that the three rollers 321 are in internal contact with the inner periphery CA (or CB) and the specimen T is stably held. For example, one roller 321 may be made to be in internal contact with an uppermost portion of the inner periphery CA (or CB), and the remaining two rollers 321 may be made to be in internal contact with the inner periphery CA (or CB) at positions lower than the rotation center axis Ax of the specimen T supported by the rollers 321. In other words, the three rollers 321 may be disposed such that two of the three rollers 321 are disposed lower than a central axis of a virtual circumscribed cylinder VC of the three rollers 321, and the remaining one of the three rollers 321 are disposed higher than the central axis of the virtual circumscribed cylinder VC. The specimen T is most stably held by the three rollers when the three rollers are disposed such that the triangle defined by the internal contact positions of the three rollers to the inner periphery CA (or CB) forms an equilateral triangle (FIG. 12).

Similarly, in case four or more rollers 321 are provided, the rollers 321 just have to be disposed such that the rollers 321 are in internal contact with the inner periphery CA (or CB) and stably support the specimen T. For example, the specimen T is most stably held by the rollers 321 when the rollers 321 are disposed such that a polygon defined by the internal contact positions of the rollers 321 to the inner periphery CA (or CB) forms a regular polygon.

It is noted that the inner periphery CA (or CB) is not necessarily a complete circle. Therefore, in case three or more rollers 321 are provided, it is preferable that the third and following rollers 321 are elastically supported to press the inner periphery CA (or CB) in outer peripheral directions so as to enable the specimen T to rotate by absorbing distortion of the inner periphery CA (or CB).

In the above described embodiments, the rollers 321 are made to be in internal contact with the inner peripheries CA and CB to support the specimen T, but rotatably supported balls may be used in place of the rollers 321.

In the above described embodiments, air cylinders are used for the pin driver 424 and the slide driver 43, but linear actuators of other types (e.g., electric motors or hydraulic motors) may also be used.

Hereinabove, the illustrative embodiment according to aspects of the present disclosure has been described. The present disclosure can b'e practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

What is claimed is:

1. A dynamic balance testing device, comprising:
 a plurality of support rollers having respective rotation axes extending in a predetermined direction, the plurality of support rollers being configured to support a specimen in internal contact with an inner periphery of the specimen in such a manner that the specimen is rotatable about a central axis of the inner periphery, the plurality of support rollers including:
a first support roller having a first rotation axis that is parallel to the central axis of the inner periphery of the specimen; and
a second support roller having a second rotation axis that is parallel to the central axis of the inner periphery of the specimen and is positionally different from the first rotation axis of the first support roller;
wherein the dynamic balance testing device is configured to detect vibration occurring on the specimen when rotated, and calculate a dynamic balance of the specimen based on the detected vibration.

2. The dynamic balance testing device according to claim 1, wherein a distance between farthest positions on the first and second support rollers from each other in a direction perpendicular to the predetermined direction is narrower than a diameter of the inner periphery.

3. The dynamic balance testing device according to claim 1, wherein the first support roller and the second support roller have an identical diameter and are disposed at an identical height.

4. The dynamic balance testing device according to claim 1, wherein the plurality of support rollers further include a third support roller having a third rotation axis that is parallel to the central axis of the inner periphery of the specimen and is positionally different from the first and second rotation axes.

5. The dynamic balance testing device according to claim 4, wherein:
the first support roller and the second support roller are disposed higher than a central axis of a virtual circumscribed cylinder of the plurality of support rollers, and
the third support roller is disposed lower than the central axis of the virtual circumscribed cylinder.

6. The dynamic balance testing device according to claim 5, wherein the third support roller is configured to support the specimen in internal contact with a lowermost portion of the inner periphery.

7. The dynamic balance testing device according to claim 4, wherein:
the first support roller and the second support roller are disposed lower than a central axis of a virtual circumscribed cylinder, and
the third support roller is in internal contact with an uppermost portion of the inner periphery.

8. The dynamic balance testing device according to claim 4, wherein an equilateral triangle is defined by respective contact positions where the first support roller, the second support roller and the third support roller are in internal contact with the inner periphery.

9. The dynamic balance testing device according to claim 4, wherein:
the plurality of support rollers further includes a fourth support roller having a fourth rotation axis that is positionally different from the first, second, and third rotation axes, and is parallel to the central axis of the inner periphery of the specimen, and
a regular polygon is defined by respective contact positions where the plurality of support rollers are in internal contact with the inner periphery.

10. The dynamic balance testing device according to claim 1, further comprising a pressing roller configured to press against a side face of the specimen perpendicular to the central axis of the inner periphery of the specimen and restrict a position of the specimen in the predetermined direction.

11. The dynamic balance testing device according to claim 10, further comprising:
a first holder and a second holder, each having at least two support rollers of the plurality of support rollers, the at least two support rollers of the first holder including the first support roller and the second support roller, the at least two support rollers of the second holder including a third support roller rotatable about the first rotation axis, and a fourth support roller rotatable about the second rotation axis, and
a further pressing roller,
wherein:
the first holder is configured to support the specimen from a side of a first end portion of the specimen in the predetermined direction,
the second holder is configured to support the specimen from a side of a second end portion of the specimen in the predetermined direction,
the first holder comprises the pressing roller and the second holder comprises the further pressing roller,
the pressing roller of the first holder is configured to press against a first side face formed at the first end portion of the specimen in the predetermined direction, and
the further pressing roller of the second holder is configured to press against a second side face formed at the second end portion of the specimen in the predetermined direction.

12. The dynamic balance testing device according to claim 1, further comprising a rotary driver configured to drive the specimen to rotate.

13. The dynamic balance testing device according to claim 1, further comprising:
a first holder and a second holder, each having at least two support rollers of the plurality of support rollers, the at least two support rollers of the first holder including the first support roller and the second support roller, the at least two support rollers of the second holder including a third support roller rotatable about the first rotation axis, and a fourth support roller rotatable about the second rotation axis,
wherein:
the first holder is configured to support the specimen from a side of a first end portion of the specimen in the predetermined direction, and
the second holder is configured to support the specimen from a side of a second end portion of the specimen in the predetermined direction.

14. The dynamic balance testing device according to claim 13, wherein:
the at least two support rollers of the first holder are configured to support the specimen in internal contact with a first inner periphery portion formed at the first end portion of the specimen in the predetermined direction, and
the at least two support rollers of the second holder are configured to support the specimen in internal contact with a second inner periphery portion formed at the second end portion of the specimen in the predetermined direction.

15. The dynamic balance testing device according to claim 13, further comprising a slide mechanism configured to support the first holder or the second holder slidably only in the predetermined direction between a testing position where a test for the specimen is to be performed and a retreat position where the specimen is attachable to and detachable from the dynamic balance testing device.

16. The dynamic balance testing device according to claim 15, wherein the slide mechanism comprises two linear guideways configured to support the first holder or the second holder slidably in the predetermined direction.

17. The dynamic balance testing device according to claim 15, wherein the slide mechanism comprises a slide driver configured to drive the first holder or the second holder in the predetermined direction between the testing position and the retreat position.

18. The dynamic balance testing device according to claim 15, wherein the slide mechanism comprises a locking mechanism configured to lock the first holder or the second holder in the testing position.

19. The dynamic balance testing device according to claim 18, wherein:
the locking mechanism comprises:
  a frame attached to the first holder or the second holder;
  a locking pin; and
  a pin driver configured to drive the locking pin in an axial direction of the locking pin,
the frame has:
  a slot extending in the predetermined direction; and
  a spot-faced part formed along the slot at a first-holder side or a second-holder side, and
the locking pin has:
  a head; and
  a shaft extending from one end of the head, the shaft being inserted through the slot and having a distal end connected to the pin driver.

20. The dynamic balance testing device according to claim 1, further comprising a pair of accelerometers configured to detect vibration occurring on the specimen when rotated.

* * * * *